US006784441B2

(12) United States Patent
Ahlers et al.

(10) Patent No.: US 6,784,441 B2
(45) Date of Patent: Aug. 31, 2004

(54) HANDSENSOR FOR AUTHENTICITY IDENTIFICATION OF SIGNETS ON DOCUMENTS

(75) Inventors: Benedikt Ahlers, Berlin (DE); Roland Gutmann, Falkensee (DE); Arnim Franz-Burgholz, Berlin (DE); Anett Bailleu, Berlin (DE); Manfred Paeschke, Basborf (DE); Peter Halter, Frauenfeld (CH); Hans Zerbel, Berlin (DE); Uwe Weber, Hamburg (DE)

(73) Assignees: Bundesdruckerei GmbH, Berlin (DE); Baumer Electric AG, Fraunfeld (CH)

( * ) Notice: Subject to any disclaimer, the term of this patent is extended or adjusted under 35 U.S.C. 154(b) by 38 days.

(21) Appl. No.: 09/899,742

(22) Filed: Jul. 3, 2001

(65) Prior Publication Data

US 2004/0031929 A9 Feb. 19, 2004

(30) Foreign Application Priority Data

Jul. 3, 2000 (DE) .......................................... 100 31 388

(51) Int. Cl.[7] .............................................. G01N 21/64
(52) U.S. Cl. .................................................. 250/458.1
(58) Field of Search ....................................... 250/458.1

(56) References Cited

U.S. PATENT DOCUMENTS

| | | | |
|---|---|---|---|
| 4,072,859 A | 2/1978 | McWaters | |
| 4,544,266 A | 10/1985 | Antes | |
| 4,591,707 A | 5/1986 | Stenzel et al. | |
| 4,745,276 A * | 5/1988 | Broicher et al. | 250/458.1 |
| 4,772,125 A * | 9/1988 | Yoshimura et al. | 250/458.1 |
| 4,949,391 A | 8/1990 | Faulkerson et al. | |
| 5,306,899 A | 4/1994 | Marom et al. | |
| 5,541,012 A | 7/1996 | Ohwaki et al. | |
| 5,818,582 A | 10/1998 | Fernandez et al. | |
| 6,038,032 A | 3/2000 | Kokubo | |

(List continued on next page.)

FOREIGN PATENT DOCUMENTS

| | | | | |
|---|---|---|---|---|
| DE | 43 39 417 A1 | 5/1995 | | |
| FR | 2 642 545 A1 | 8/1990 | | |
| GB | 2 267 357 A | 12/1993 | | |
| GB | 2 334 574 A | 8/1999 | | |
| GB | 2342434 A * | 4/2000 | ............. | F21L/4/00 |

OTHER PUBLICATIONS

SAC CHAC Jeong et al., "Observation of Superfluorescence from Pi–Conjugated Polymeric Thin Films Probed by Fluorescec Up–Converstion Method" Quantam Electronics and Laser Science Conference. (Quels 2000) Technical Digest. Postconference Edition, San Francisco, CA May 7–12, 2000 New York, IEEE, US; BD, 40: pp. 194–195 XP001051939 ISBN: 0–7803–5992–5.

*Primary Examiner*—Constantine Hannaher
(74) *Attorney, Agent, or Firm*—Katten Muchin Zavis Rosenman

(57) ABSTRACT

A manually controlled sensor for authenticity identification of luminescent identification features on documents is described, in which the identification feature is illuminated with an excitation wavelength and may respond at a different wavelength, with the response wavelength being detected and evaluated by a radiation receiver. In order to improve the sensitivity and to comply with the safety at work regulations, a focused beam (31, 32), which is emitted from a beam source (1), is converted by focusing optics (2, 3) in such a manner that a scanning bar (22), which is approximately in the form of a line, is projected on the surface of the object (5) to be investigated, which causes the identification region (21) which is arranged on the object (5) to fluoresce in a luminescent manner in at least one subregion, and the luminescence signal produced in this way is passed via detection optics (9, 9', 10) to an evaluation unit (11), which evaluates the luminescence signal. The sensor is intended to be classified in laser class 3A.

33 Claims, 4 Drawing Sheets

U.S. PATENT DOCUMENTS

| | | | | |
|---|---|---|---|---|
| 6,234,537 | B1 | 5/2001 | Gutmann et al. | |
| 6,263,584 | B1 * | 7/2001 | Owens | 33/640 |
| 2001/0035501 | A1 * | 11/2001 | Taylor et al. | 250/461.1 |
| 2002/0003619 | A1 * | 1/2002 | Ahlers et al. | 250/458.1 |
| 2003/0026000 | A1 * | 2/2003 | Deckenbach et al. | 359/624 |

* cited by examiner

HANDSENSOR FOR AUTHENTICITY IDENTIFICATION OF SIGNETS ON DOCUMENTS

The invention relates to a handheld sensor for authenticity identification of signets on documents as claimed in the preamble of patent claim 1, and to a signet which interacts with the sensor and has at least one identification feature. Such a sensor has been disclosed by the subject matter of DE 41 17 011 A1, in which low-intensity radiation, in particular diffuse radiation, is intended to be detected, such as that which also occurs when checking currency bills which are provided with luminescent features.

The sensor system described there comprises a conically widening optical fiber rod and further-processing optics, in which case the radiation coming from the measurement object can be detected over a wide spatial angle using the narrow cross-section end of the fiber rod. Owing to the cross-section conversion, the radiation emerges from the fiber rod at a considerably narrower angle, which is matched to the aperture angle of the subsequent optics.

Although it is possible to detect relatively low-intensity luminescent features using this sensor, the strength of the detected luminescent features cannot, however, fall below a specific threshold when they are distributed over a relatively large area. It is therefore still relatively insensitive. This is because the use of a conically formed fiber rod results in the disadvantage that detection can take place only in a region in the form of a point on the document, which fails to occur when the element to be investigated (also referred to as the identification feature) is arranged at other points on the document.

Furthermore, excitation using conventional light sources with visible light (for example incandescent lamps) leads to a relatively weak luminescence signal, which must be detected by the fiber rod and must be supplied to the evaluation optics.

Furthermore, with the known sensor it is impossible to provide manual operation, in which a manually controlled sensor is moved over an object which has one or more signets on it and whose authenticity is intended to be checked. Manually controlled operation with this sensor is not described.

The invention is therefore based on the object of developing a handheld sensor for authenticity identification of signets on documents such that luminescent signets (that is to say signets with identification features based on fluorescence, phosphorescence, up-conversion, etc.) on the document can be identified over a considerably larger area on the document, and manually controlled operation is possible.

In order to achieve said object, the invention is distinguished by the technical teaching in claim 1.

A handheld sensor according to the invention is preferably used when it is also retrospectively intended to check the authenticity of authenticity signets which are not identified automatically.

However, such a handheld sensor can also be used independently of automatic facilities, for example for authenticity identification of entry cards, credit cards and all other situations which involve fast, highly sensitive checking of identification features, independently of machines.

The major feature of the invention is that a focused beam which is emitted by a beam source is converted by focusing optics in such a manner that a scanning line, which is roughly in the form of a line, is produced on the surface of the document to be investigated and optically excites the identification feature which is arranged on the document, and the optical response signal is evaluated via detection optics by an evaluation unit.

In order to delineate the individual terms from one another, the term “identification feature” is used generally as a feature which verifies the authenticity of a document, can be applied directly to the document itself, but which is also arranged in the region of a signet.

The term “signet” describes a mark or a label, a seal, a delineated area of any type or a printed region on a document, which is connected (for example by being bonded on) detachably or non-detachably to the document on which the identification feature is arranged. The later description does not define whether the identification feature is located directly on the document itself or is part of a signet applied to the document and which is connected detachably or non-detachably to the document.

The given technical teaching results in the major advantage that the production of a scanning line, which is approximately in the form of a line, on the document to be investigated for the first time makes it possible to investigate not only areas in the form of points on the document, but an entire area in the form of a line, which is converted into a corresponding investigation area when the handheld sensor is moved over the document at a specific speed approximately at right angles to the longitudinal axis of the scanning line.

It is thus now for the first time possible to use a sensor which is moved by hand to move the measurement window associated with the sensor over a large area of a document, and thus to investigate for the presence of identification features and, in the process, to use the scanning line which is projected onto the document surface to scan a relatively large area of the document.

It is preferable for the so-called up-conversion effect to be used. In this case, the excitation wavelength is longer than the reflected wavelength emitted by the identification feature. Expressed in the frequency domain, this means that the excitation frequency is lower than the response frequency.

The invention also relates to other excitation mechanisms, however, such as the use of the “normal” fluorescence effect, in which a specific wavelength is used for excitation and the fluorescent identification feature responds at a longer wavelength, which represents the opposite effect to said up-conversion effect.

A third embodiment relates to the fluorescence effect in which the excitation is at the same wavelength as the emission wavelength, but with the response pulse following the excitation pulse with a defined time delay.

All said effects are the subject matter of the present invention, and the area of protection of the invention extends to the use of all said effects, also when combined with one another.

One particular problem in the prior art is solved by particularly simple means by the present invention:

Manually controlled sensors are subject to two mutually contradictory requirements:

According to the first requirement, the evaluation of the signal from the handheld sensor should be as sensitive as possible in order to allow even relatively weak signals to be identified. To this end, it is desirable for the laser which is arranged in the handheld sensor to produce a high-energy laser beam which is as powerful as possible.

However, the contradictory requirement to this is that the laser beam must not lead to injuries if operated incorrectly. For this reason, the laser should be in as low a laser class as possible, in order to avoid the possibility of a high-energy laser leading to injuries to the human body during operation.

These two requirements are mutually contradictory since, firstly, clearly distinguished identification demands a high-energy laser and, secondly, a high-energy laser is undesirable for safety at work reasons.

As a consequence of this, the invention makes it possible to use a relatively high-energy laser to achieve high-sensitivity scanning of a weakly radiating signet, because it is possible to use a relatively high-energy laser source in a laser class higher than class 3A, while the invention ensures that the laser is switched on only when the handheld sensor has been moved sufficiently close to the scanning surface to be investigated and/or that beam forming measures allow the sensor to be classified in laser class 3A or lower despite the powerful radiation source. For the former, the invention proposes a sensor system which identifies and evaluates the proximity of the laser to the document surface and, on this basis, controls the switching-on and, if necessary, also the switching-off of the laser.

Laser class 3A is a preferred laser class, which on the one hand allows effective identification even of weakly radiating signets, while on the other hand precluding health hazards.

According to a first feature, an important aspect of the invention is that the laser which is arranged in the handheld sensor is operated only when the proximity of the head surface to an object, or even the head surface being placed on an object, with the signet (identification feature) arranged on said object, has been identified reliably. This results in eye protection even with relatively powerful lasers.

Such proximity identification can be achieved in various ways.

A first, preferred refinement provides for the proximity to be detected by scanning the surface of the object. Such scanning can be carried out by means of optics and a transmitting/receiving arrangement, which preferably operates in the IR band, with, for example, an LED being connected as the transmitting diode, and a single photo diode or a double photo diode being connected as the receiving diode.

When the scanning beam of this arrangement is now reflected from the object to be investigated, the reflected beam is then evaluated by the receiving photo diode in the handheld sensor, thus reliably confirming proximity to the object. The laser operates only when this proximity has been confirmed, and then scans the object with the laser beam in order to check the identification feature.

In the case of a single photo diode as the receiving diode, focused optics are used which ensure that only light from the light spot 24 strikes the photo diode when the object is located directly in front of or very close underneath the outlet window 7. In the case of a double photo diode as the receiving diode, a triangulation evaluation can be achieved. If the object is well in front of the outlet window 7, then the light imaged by the light spot 24 strikes one photo diode (the first part of the double photo diode) which is referred to as the background diode. If, on the other hand, the object is directly in front of the outlet window, then the light strikes the other photo diode (second part of the double photo diode), which is referred to as the foreground diode. This allows proximity to be identified even more reliably than when using only one photo diode.

Another refinement of this technical teaching provides for touching scanning to be carried out rather than scanning without making contact. Touching scanning may be, for example, a contact switch or a pressure sensor which emits a signal only when the head surface of the handheld sensor has been placed on the object.

All said proximity identification processes can preferably be combined with a manually controllable button (switch or pushbutton), so that the laser is switched on only when this button is also operated and on identification that the handheld sensor is in the proximity of the object.

The given technical teaching thus results in the advantage that a highly sensitive handheld sensor can also be used for identification of weakly luminescent signets, and ensures reliable manual operation while complying with the safety at work regulations.

Independently of the identification of the proximity of the handheld sensor to an object using an identification feature arranged on that object, as mentioned above, further technical teaching claims that so-called line optics are used for producing the laser beams in the handheld sensor. This means that the focused laser beam produced by the laser is imaged differently in the X and Y directions on the object. It is preferable for the focusing in the Y direction to be above the scanning bar produced on the surface of the document and above the document, that is to say in the region of the beam path of the sensor (still within the sensor housing), while the focusing in the X direction is directly on the object (=document surface) itself. It is furthermore preferable for the beam angles of the outermost focused beams with respect to the optical axis to be as large as possible.

These focusing planes, which are offset with respect to one another at different heights above the document surface, ensure that, if the focused laser beam enters an animal or human eye, it is no longer possible for the beam to be imaged in the form of a point on the retina of the eye. This avoids point damage to the retina, since the laser beam is focused at different distances in front of the retina in the X and Y directions. On the other hand, illumination of the retina with the image of the elongated scanning bar takes place with an illumination intensity which is greatly reduced in comparison to the point image, firstly because of the offset focusing planes, and secondly because of the steep beam angles since the 7 mm aperture size of the eye can no longer receive all the radiation.

This prevents any adverse effects, forming a health hazard, to the retina of the eye, even if a somewhat more powerful laser is used. Thanks to the above-mentioned measures, the sensor can be classified in a lower, and thus more safe, laser class than without these measures. For example, on the basis of these measures, the sensor can be classified in laser class 3A instead of 3B, which makes a very major difference. Furthermore, thanks to the use of these special line optics, a somewhat more powerful laser can be used, which is better for evaluation of weak signals but nevertheless guarantees that the handheld sensor can be handled safely.

In the simplest case, the line optics comprise a cylindrical lens. However, instead of such a simple cylindrical lens, it is also possible to use a compound lens, such as a convergent lens, in conjunction with a cylindrical lens or specially shaped cylindrical lenses.

The convergent lens in this case provides the focusing on the object surface, while the cylindrical lenses produce the highly divergent (defocused) beams on the object, which form the elongated scanning bar on the object.

In order to allow beam angles which are sufficiently large to attain the advantage for the invention, it is generally necessary to use two cylindrical lenses in series, and/or to equip these lenses with a special shape. The cylindrical lenses then no longer have a circular-cylindrical surface, but an aspherical, conical surface which is different than it. This allows good beam guidance to be achieved even at steep beam angles. The shape of the surface is optimized using optical design software. Alternatively detractive optical elements can also be used, or Fresnel lenses, or sinusoidal surfaces. All these elements are part of the line optics and have characteristics which are similar to those of normal cylindrical lenses, but are improved for the application.

The essential features of the invention are repeated, once again, in abbreviated form below:

- Wide-aperture receiving optics with an f-number of approximately 1.
- Laser line optics with steep outlet angles in order to reduce eye and skin danger when using a powerful laser diode, which at the same time allows classification in a lower laser class. The aim is laser class 3A or lower, so that there is no longer any hazard in normal use.
- Additional safety measures:
  - Pushbutton: laser transmits its light only when there is finger pressure on the pushbutton.
  - optical light probe or additional, mechanical contact probe in order to identify this object.
  - Time limit: the laser light is only ever emitted for about 2 seconds when the two above criteria are satisfied.
- Identification of small spectral light components from weakly back-scattering identification features on objects.
- Shadowing of external light by the characteristics of the handheld sensor; the handheld sensor must be moved into contact above those points on the object where the identification feature is applied.
- The handheld sensor scans an area with a width of approximately 2 mm during movement, thanks to its approximately 2 mm-wide laser line.

The subject matter of the present invention results not only from the subject matter of the individual patent claims, but also from the combination of the individual patent claims with one another.

All the statements and features disclosed in the documents, including the abstract, in particular the physical embodiment illustrated in the drawings, are claimed as being substantial items relating to the invention, to the extent that they are novel individually or in combination when compared to the prior art.

The invention will be explained in more detail in the following text with reference to drawings, which illustrate only one possible embodiment. In this case, further features and advantages which are substantial with regard to the invention are evident from the drawings and from their description.

Figure 1:
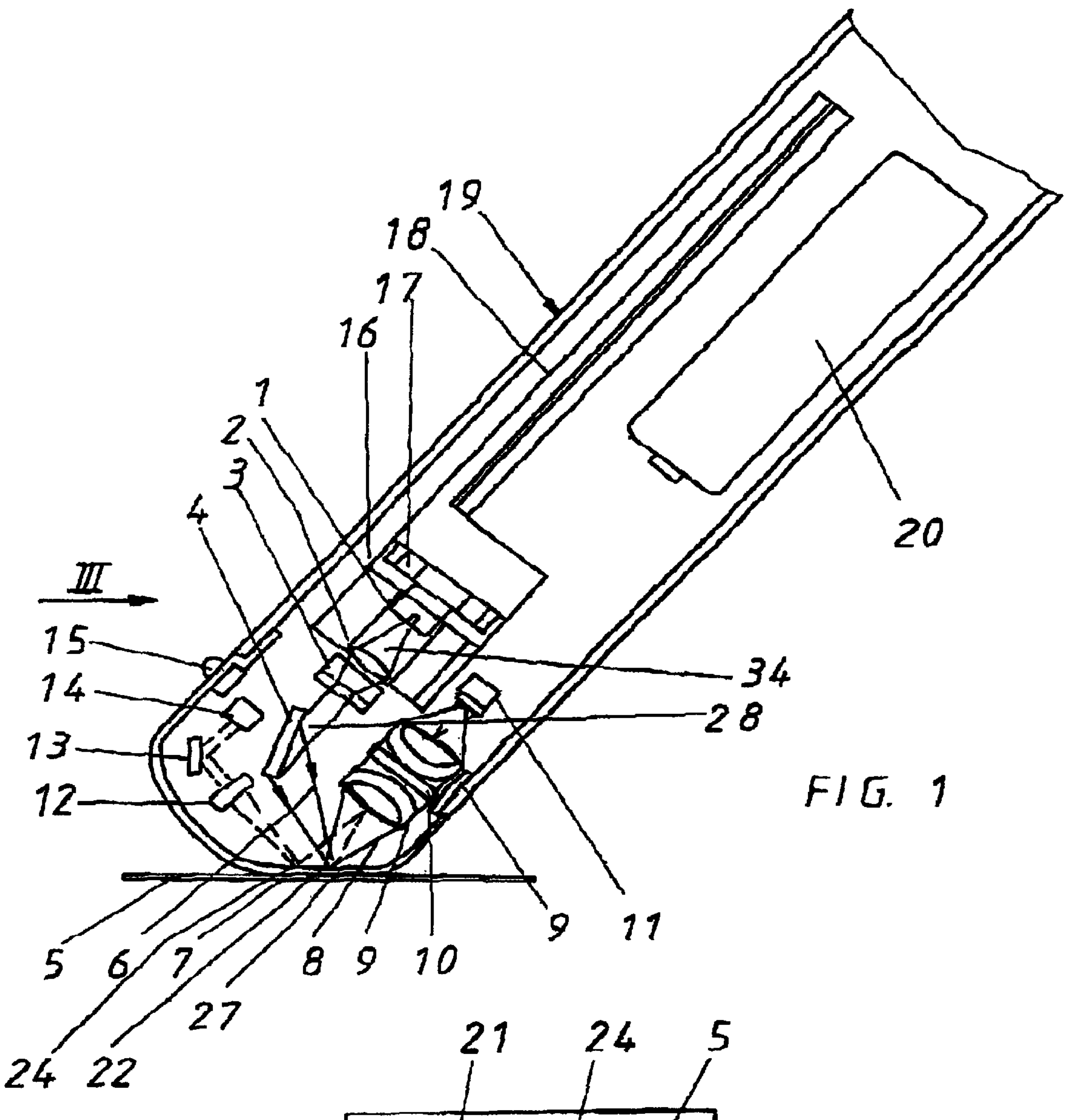
FIG. 1 shows a schematically drawn section through one embodiment of a handheld sensor according to the invention

One or more batteries or rechargeable batteries 20 can be arranged in the housing, and are used to supply power to the laser diode 1. An external power connection can also be provided on the housing, instead of the battery 20. A separate battery pack can likewise be provided, and is connected to the handheld sensor via a relatively long cable.

The laser diode 1 produces a focused beam 34, which first of all passes through one or more focusing lenses 2. These focusing lenses 2 focus the beam in the X-direction (focused beam 32 in FIG. 5) essentially onto the object plane of the object 5 to which the identification feature 21 is applied.

The important feature is that the focusing lens 2 is followed by line optics 3 which, in the simplest case, comprise a cylindrical lens. The term "line optics 3" generally means any optics which are able to produce a scanning bar 22 approximately in the form of a line or an ellipse. This scanning bar 22 is illustrated, by way of example, in FIG. 5, and will be described in more detail in conjunction with this figure there.

Figure 5:
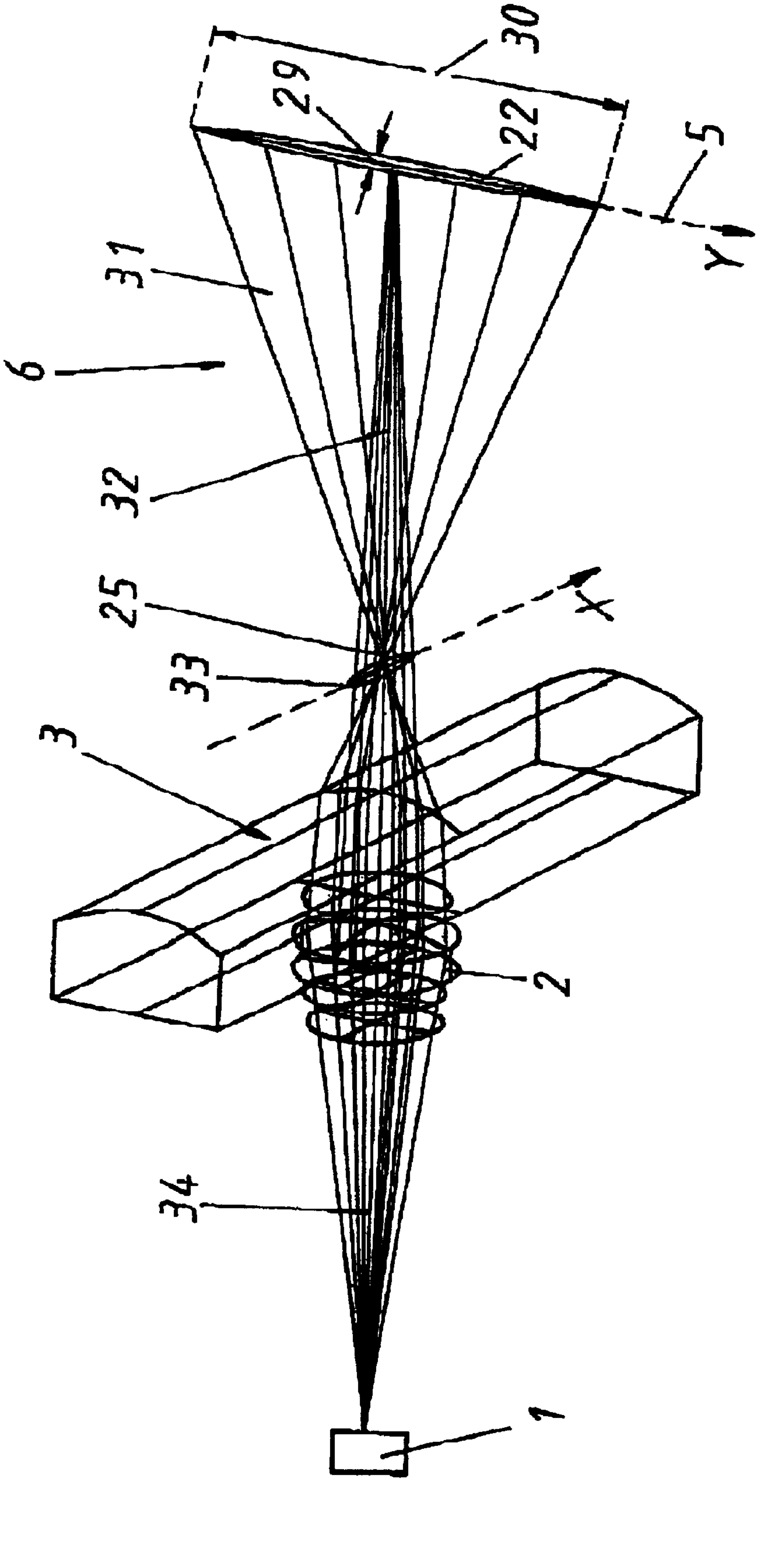
FIG. 5 illustrates the focused beam in the X- and Y-directions of line optics The handheld sensor has a housing whose cross section is substantially approximately circular-cylindrical but which may also be polygonal, oval or square. This housing is annotated 19 in FIG. 1.

The focused beams 31, 32, which are produced and are illustrated in FIG. 5 are combined as transmitted beams 28 in FIG. 1, and are passed to a deflection mirror 4, which has been omitted from FIG. 5, for the sake of simplicity.

This results in the somewhat elongated scanning bar 22 shown in FIG. 5, which emerges from the outlet window 7 on the head surface 26, 27 of the handheld sensor.

Figure 3:
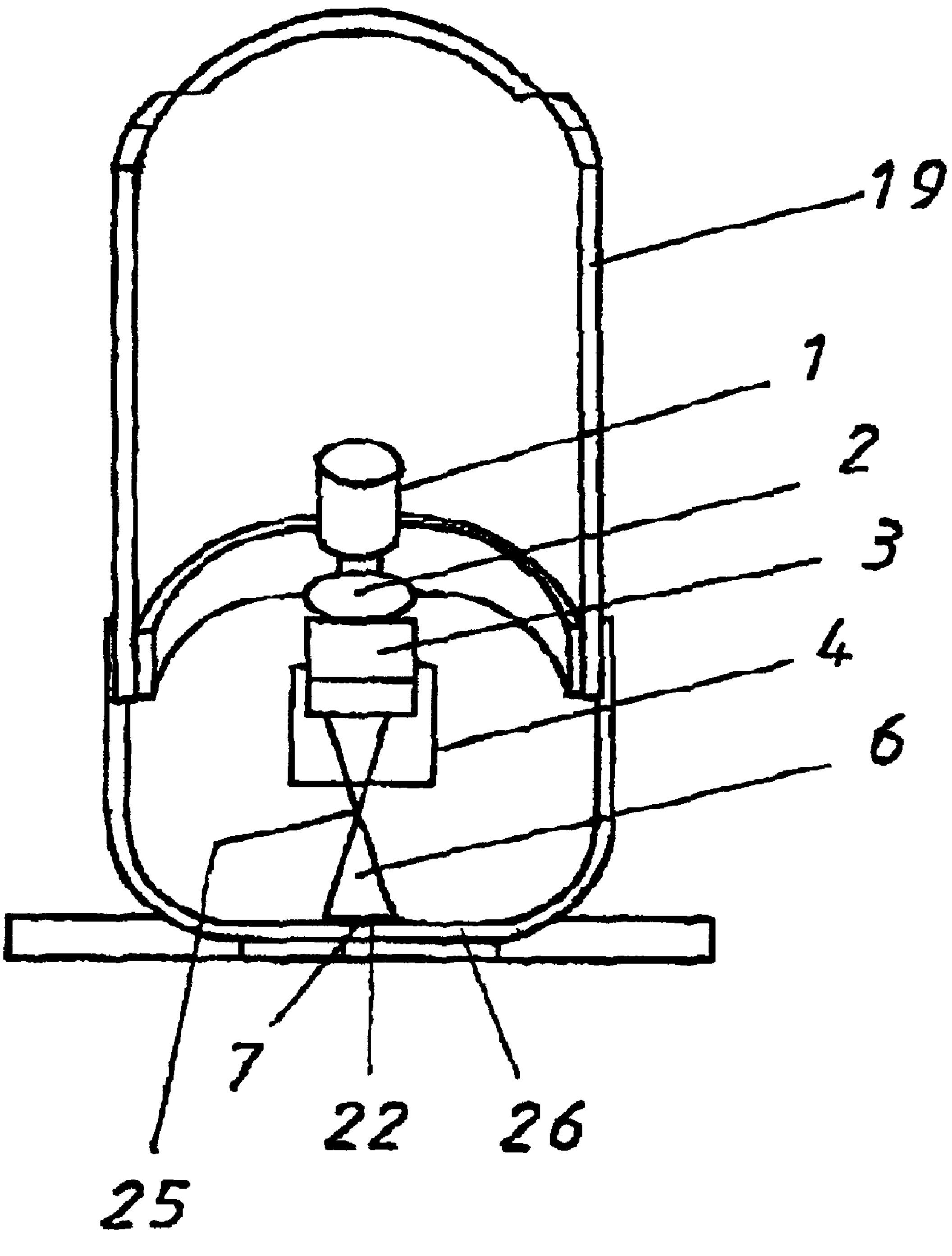
FIG. 3 shows a front view of the handheld sensor in the direction of the arrow III in FIG. 1

FIG. 3 shows that the head surface area 26 (width of the scanning head) is considerably larger than, by comparison, the width of the outlet window 7. This reliably suppresses external light influences arriving from the side.

The same generally also applies to the extent of the head surface 27 in the longitudinal direction (direction of the arrow 23).

Thus, overall, the focused beam directed at the object 5 is annotated 6 (transmitted beams).

Further explanations will be given later, with reference to FIG. 5.

Figure 2:
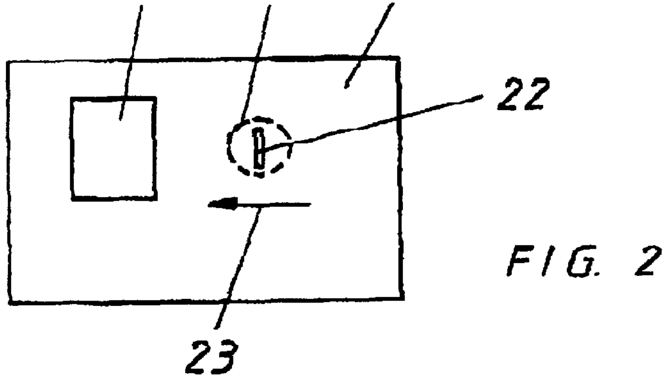
FIG. 2 shows a plan view of an object with an identification feature arranged on it, and with the scanning bar

The scanning bar 22 produced as shown in FIG. 2 is passed in the direction of the arrow 23 in the direction of the identification feature 21 via the object 5.

Apart from this, in this context, it should be mentioned that FIG. 2 illustrates, only schematically, a light spot 24 of the proximity sensor system which scans the document surface. The evaluation of the reflected component confirms the presence of the document. The light spot 24 covers the scanning bar 22 only by way of illustration. It can also be arranged alongside, behind or in front of the scanning bar.

The term light spot 24 is, in general, not intended to imply that this is visible light. It may also be in an invisible band, specifically in the IR or UV bands.

The beam component reflected from the identification feature 21, which may be at a different wavelength than the transmitted beam 6, is radiated back as a received beam 8 into the handheld sensor, and is focused via a first receiving lens 9.

A second receiving lens 9', which produces further focusing, can be arranged behind the first receiving lens 9.

The received focused beam, which has been received and focused in this way, is, finally, passed via an optical filter 10 to illuminate a receiving element 11 which may, for example, be a photo diode or an avalanche photo diode.

A photo multiplier may also be used instead of the receiving element 11 described here.

The described laser optics result in the advantage that the use of specific line optics results in the production of a transmitted focused beam with steep beam angles, and this in turn allows the handheld sensor to be classified in a comparatively low, safe laser class.

A first embodiment of identification of the proximity of the handheld sensor to the surface of the object 5 is described in the following text.

Figure 4:
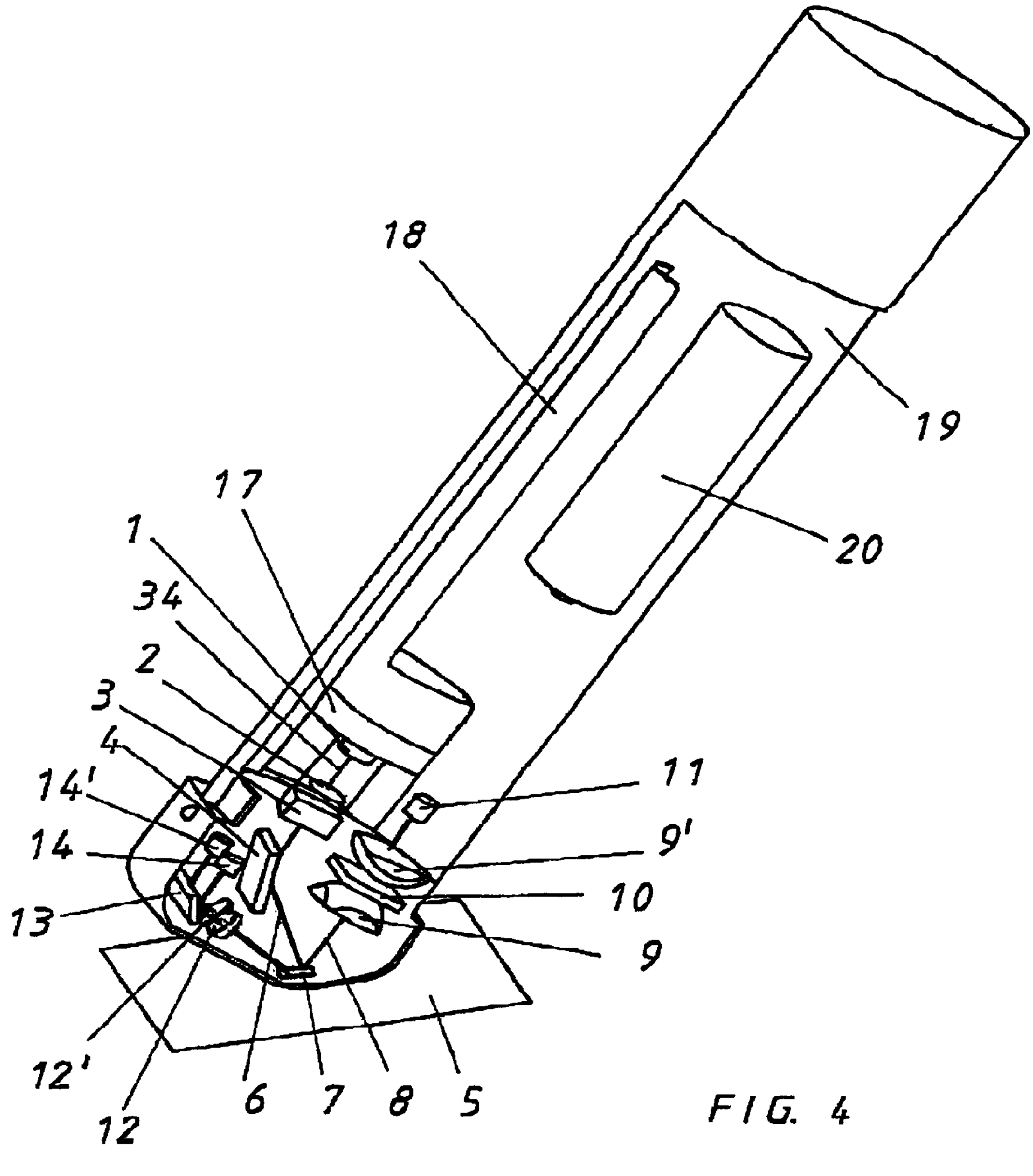
FIG. 4 shows an illustration of the elements of the handheld sensor, illustrated in perspective rather than as in FIG. 1

In this context, it can be seen from FIGS. 1 and 4 that a transmitted beam—preferably in the IR band—is transmitted by means of a light-emitting diode 14 and is focused onto the outlet window 7 via a deflection mirror 13 and one or more lenses 12.

The beam from the light-emitting diode thus strikes the surface of an object 5, which is in direct contact with the window 7 of the handheld sensor, or is arranged a short distance in front of this window.

The beams reflected from the object 5 are received again on the same route by lenses 12, are deflected there via the deflection mirror 13, and are passed to a receiving diode 14', which is connected to appropriate electronics.

As soon as the receiving diode 14' identifies a reflected transmitted beam from the proximity sensor system, this ensures that the handheld sensor is a short distance away from the object 5, or is even touching it, and the laser diode 1 is switched on only in this situation.

Instead of the described non-contacting scanning of the object 5, touching scanning processes may also be used. The arrangement of the LED 14 and photo diode 14' can then be replaced by touching scanning of the object surface, for example by means of a contact switch or a contact bracket, or else a pressure sensor.

In general, the proximity identification process (operating by touch or non-contacting) is thus intended to ensure that the laser is switched on only when it is certain that the outlet window 7 is in contact with, or is virtually in contact with, the object 5.

In addition, a pushbutton 15 can also be arranged in the housing 19, which is operated by manual finger pressure and on whose operation the laser diode 1 is switched on.

This ensures that the laser diode 1 is not switched on automatically by the proximity sensor system but that it is also necessary to deliberately operate the pushbutton 15 as well.

In addition, a heat sink 16 for the laser diode 1 can also be installed in the housing, preferably being in the form of a cold wall.

A temperature stabilization element 17 can also be installed, comprising, for example, a heating coil or a Peltier element with an additional temperature sensor.

The temperature stabilization element 17 is intended to ensure that the temperature of the laser diode 1 is uniform.

Once, in one preferred embodiment, the Peltier element has cooled the laser diode 1, the heat produced by the Peltier element must be dissipated via a further heat sink 18.

The heat sinks 16 and 18 described here are, however, not essential to the solution, and may also be omitted if required.

The temperature stabilization element 17 may likewise also be omitted for various applications.

In comparison with FIG. 5, it can be seen from FIG. 3 that there is a crossing point 25 in the Y-plane (FIG. 5), so that the focused beam 31 widens once again beyond this crossing point, thus producing the elongated scanning bar 22.

Instead of a focusing cylindrical lens (line optics 3), a divergent cylindrical lens may also be used, in which case the crossing point 25 is beyond the cylindrical lens 3. The crossing point 25 is thus virtual.

FIG. 5 also shows that the use of the chosen line optics results in the focusing in the X- and Y-planes being at a different height above the object.

While the focused beam 32 is focused directly on the object in the X-axis, as is illustrated by the narrow width of the area 29 in FIG. 5, it can be seen on the other hand that the focusing in the Y-direction is in the form of the focused beam 31 at the crossing point 25, so that a somewhat elongated scanning bar of length 30 and width 29 is produced beyond this crossing point 25.

This results in the advantages of a relatively high total energy density being applied to the plane of the object 5, but without any focusing at a single point on the plane of the object 5 or anywhere else, so that even if a human eye were to be present instead of the object 5, there would be no need to be concerned about damage to the retina, or any such damage would at the very least be very greatly reduced.

The eye can no longer focus this focused beam as a point on the retina.

The described technical teaching thus proposes a handheld sensor in which even weakly luminescent signets (identification features 21) can be identified with high identification accuracy, without there being any risk of damage to a human or animal eye.

Two different areas of the invention are claimed independently of one another and in combination with one another, namely the laser being switched on only when in proximity with the object surface has been identified reliably and/or the use of line optics which prevent point focusing on a human or animal eye despite the use of a relatively high-energy beam. Furthermore, the laser is switched on only when a pushbutton on the handheld sensor has previously been activated by finger pressure.

These receiving optics have a wide aperture, that is to say they have an f-number of approximately 1, and are therefore particularly sensitive to light.

The laser (laser diode 1) can also be replaced by a powerful LED or by a different radiation source or surface emitter, or even by a superluminescence diode.

In rare cases, the line optics may also be dispensed with, if the beam outlet already has the desired elongated surface area of the scanning bar 22 (length 30 and width 29) and is not coherent.

In this case, there is no need for an elongated form of length 30, and the scanning bar 22 can also, overall, be in the form of a round bar with a specific extent.

In order to provide a seal against external light, additional sealing means can also be used on the head surface 26, 27 such as sealing brushes or lips or the like at the side.

Apart from this, the described proximity sensor system results in the advantage that the laser is not switched on if the object 5 is transparent glass. This is because the proximity sensor system preferably reacts to diffuse reflection, and not to mirror reflection, on the surface of the object 5.

Furthermore, the receiving element 11 in the laser arrangement can also provide external light identification. The laser is not switched on when external light or ambient light is being received.

This shows that the proximity sensor system can also be integrated in the laser optics themselves. In this case, the elements 12, 13, 14 are omitted, and the entire proximity sensor system is implemented by appropriate checking of the receiving element 11.

The laser beam reflected from the object can thus also itself be used for the proximity sensor system. In this case, only weak, very short and absolutely harmless laser pulses are first of all transmitted, these being used to monitor proximity. Only when the proximity of the object is clearly identified is the same laser raised to a more powerful laser power level, which is required in order to identify the luminescent features.

In another refinement of the invention, however, it is also possible to provide for a beam splitter to be arranged in front of the receiving element 11, which splits off a specific proportion of the laser light reflected from the object and passes this to identification optics which evaluate the reflection, produced by the object, of the weak, short laser pulses.

Furthermore, another variant of the invention can provide for the receiving element 11, or a receiving element arranged in front of the optical filter 10, not to be used for detection purposes for proximity identification of the radiation component reflected from the object. The proximity identification is carried out using the photo diode 14' illustrated in FIG. 4, using the reflected, weak and short laser pulses.

The laser is preferably pulsed in order to make it possible to suppress as far as possible external light or ambient light which nevertheless penetrates into the receiver. This can be done very well by installing high-pass, low-pass or bandpass filters in the receiver electronics, which pass only the pulse repetition frequency of the laser. Furthermore, powerful optical filters pass only the desired wavelength of the optical response from the feature which has been excited optically by the laser. All other wavelengths are suppressed, in particular including the laser wavelength itself, which in most cases creates interference in the receiver itself. The only situation in which the filters pass the laser wavelength is, of course, when the response is at the same wavelength. In this situation, a time-delayed measurement must be carried out in order to identify the optical response from the feature, that is to say monitoring is carried out after the end of each laser pulse to determine whether light from the feature can still be identified in the transmission pause. In order to suppress external light further, the signals are additionally averaged over a number of laser pulses. This is preferably done using a microprocessor, after prior analog/digital conversion.

Drawing Legend

1. Laser diode
2. Focusing lens
3. Line optics
4. Deflection mirror
5. Object with identification feature
6. Transmission beams
7. Outlet window
8. Receiving beams
9. Receiving lens (9': second receiving lens)
10. Optical filter
11. Receiving element
12., 12'. Lenses for light probe
13. Deflection mirror for light probe beams
14., 14'. LED and photo diode for light probe
15. Pushbutton
16. Heat sink for laser diode
17. Temperature stabilization element
18. Heat sink
19. Housing
20. Optional battery or rechargeable battery
21. Identification feature (signet)
22. Scanning bar
23. Arrow direction
24. Light spot
25. Crossing point
26. Head surface (width)
27. Head surface (length)
28. Transmission beams before deflection
29. Width (scanning bar)
30. Length (scanning bar)
31. Focused beam (Y-axis)
32. Focused beam (X-axis)
33. Beam cross section
34. Focused beam

What is claimed is:

1. A sensor for authenticity identification of a luminescent identification feature on a document comprising:

a beam source and a focusing optics for illuminating the identification feature with a focused beam at a wavelength in the form of an excitation wavelength to optically excite at least a subregion of the identification feature and wherein the identification feature may respond in an optical response signal at a same or different wavelength in the form of a response wavelength, a radiation receiver for detecting and evaluating the response wavelength, wherein the focused beam is emitted from the beam source and is converted by focusing optics in such a manner that a scanning bar approximately in the form of a line is projected on the surface of the document and having a detection optics and an evaluation unit, wherein the optical response signal is passed via detection optics to the evaluation unit which evaluates the optical response signal, and wherein the sensor is a manually controlled sensor, the beam source is formed as a laser, and the focusing optics has a lineoptics comprising a cylindrical lens, wherein the focused beam is a laser focused beam, which is produced by the laser passed through the lineoptics and is imaged differently in the X-direction and Y-direction on the document.

2. The sensor as claimed in claim 1, wherein the sensor has a head surface and a proximity identification, which switches on a laser only when the document is located closely in front of and touching an outlet window in the head surface.

3. The sensor as claimed in claim 2, wherein the proximity identification operates without making contact.

4. The sensor as claimed in claim 3, wherein an external light identification, which obviates switching on of the laser when external light or ambient light is being received by the external light identification, is integrated in the arrangement for proximity identification without making contact.

5. The sensor as claimed in claim 2 or 3, wherein the proximity identification reacts to diffuse reflection on the surface of the document.

6. The sensor as claimed in claim 2, wherein the proximity identification operates by touching the document.

7. The sensor as claimed in claim 2, wherein, in addition to the proximity identification, a manually operated pushbutton is provided, which is coupled to the proximity identification or whose previous operation is a prior condition for activation of the laser after identification of the proximity within a short time window.

8. A sensor as claimed in claim 1, wherein the response wavelength is a shorter, longer or equal wavelength compared to the excitation wavelength.

9. The sensor as claimed in claim 8, wherein the largest angles of the focused beams in the X-plane or Y-plane reach an angle of more than +/−10° to the optical axis.

10. The sensor as claimed in claim 1, wherein the focusing in the X-plane and Y-plane is produced at a different height above the document.

11. The sensor as claimed in claim 10, wherein the laser focused beam is focused directly on the document in the X-plane.

12. The sensor as claimed in claim 1, wherein the laser is classified in laser class 3A.

13. The sensor as claimed in claim 1, wherein the laser is pulsed.

14. The sensor as claimed in claim 13, wherein, in order to identify the identification feature on a document, the sensor is adapted to use the up-conversion effect, wherein the excitation wavelength is longer than the response wavelength.

15. The sensor as claimed in claim 13, wherein in order to identify the identification feature on a document, the sensor is adapted to use the down-conversion effect, wherein the response wavelength is longer than the excitation wavelength.

16. The sensor as claimed in claim 13, wherein in order to identify the identification feature on a document, the sensor is adapted to use the fluorescence effect, wherein the excitation wavelength is the same wavelength as the response wavelength.

17. The sensor as claimed in claim 16, wherein a pulse response is delayed in time with respect to an excitation pulse.

18. The sensor as claimed in claim 13, wherein the laser has a pulse repetition frequency and a high-pass, low-pass or bandpass filter is provided in a receiver electronics, which pass only the pulse repetition frequency of the laser.

19. The sensor as claimed in claim 13, wherein the response signal is averaged over a number of laser pulses.

20. The sensor as claimed in claim 1, wherein the detection optics is a wide-aperture receiving optics with an aperture ratio of virtually 1 or less.

21. The sensor as claimed in claim 1, wherein the laser is formed as a laser diode.

22. The sensor as claimed in claim 1, wherein the evaluation unit is formed as a receiving element.

23. The sensor as claimed in claim 22, wherein the receiving element is formed as a photodiode or an avalanche photodiode or a photomultiplier.

24. The sensor as claimed in claim 22, wherein the receiving element (11) provides an external light identification, which obviates switching on of the laser when external light or ambient light is being received by the external light identification.

25. The sensor as claimed in claim 1, wherein the cylindrical lens is a focusing cylindrical lens.

26. The sensor as claimed in claim 1, wherein the cylindrical lens is a divergent cylindrical lens.

27. The sensor as claimed in claim 1, wherein the cylindrical lens has a aspherical, conical surface.

28. The sensor as claimed in claim 1, wherein the lineoptics comprises defractive optical elements or a Fresnel lens or a sinusoidal surface.

29. The sensor as claimed in claim 1, wherein the lineoptics comprises a convergent lens.

30. The sensor as claimed in claim 1, wherein an external light identification is provided which obviates switching on of the laser when external light or ambient light is being received by the external light identification.

31. The sensor as claimed in claim 30, wherein the external light identification is integrated in a reception path of the authenticity identification of the identification feature.

32. The sensor as claimed in claim 1, wherein optical filters pass only a desired wavelength of the response signal.

33. The sensor as claimed in claim 1 wherein the sensor has a housing and one or more batteries are arranged in the housing.

* * * * *